(12) United States Patent
Hosking

(10) Patent No.: US 7,655,530 B2
(45) Date of Patent: Feb. 2, 2010

(54) SEGMENTED END ELECTRODE CAPACITOR AND METHOD OF SEGMENTING AN END ELECTRODE OF A CAPACITOR

(75) Inventor: Terry Hosking, Barre, VT (US)

(73) Assignee: SB Electronics, Inc., Barre, VT (US)

( * ) Notice: Subject to any disclaimer, the term of this patent is extended or adjusted under 35 U.S.C. 154(b) by 0 days.

(21) Appl. No.: 12/243,777

(22) Filed: Oct. 1, 2008

(65) Prior Publication Data

US 2009/0031543 A1 Feb. 5, 2009

Related U.S. Application Data

(62) Division of application No. 11/495,447, filed on Jul. 28, 2006, now Pat. No. 7,453,114.

(60) Provisional application No. 60/595,783, filed on Aug. 5, 2005.

(51) Int. Cl.
*H01L 21/20* (2006.01)
*H01L 21/8222* (2006.01)
*H02G 4/00* (2006.01)
*H01G 4/30* (2006.01)
*H01G 4/32* (2006.01)
*H01G 4/228* (2006.01)
*H01G 4/06* (2006.01)
*H01G 7/00* (2006.01)
*H17R 17/00* (2006.01)
*H05K 3/20* (2006.01)
*H05K 3/30* (2006.01)

(52) U.S. Cl. .......... 438/381; 438/239; 257/E21.008; 257/E21.011; 257/E21.014; 257/E21.17; 257/E21.02; 361/301.1; 361/301.2; 361/301.4; 361/301.5; 361/303; 361/306.1; 361/306.3; 361/309; 361/311; 361/313; 29/25.42; 29/25.35; 29/831; 29/832

(58) Field of Classification Search ............ 438/381, 438/239; 257/E21.008, E21.011, E21.014, 257/E21.17, E21.02, E27.048; 361/301.1, 361/301.2, 301.4, 301.5, 303, 306.1, 306.3, 361/309, 311, 313; 29/25.25, 25.42, 831, 29/832

See application file for complete search history.

(56) References Cited

U.S. PATENT DOCUMENTS

| | | | |
|---|---|---|---|
| 4,889,760 A * | 12/1989 | Kippenberg et al. | 428/192 |
| 6,477,035 B1 | 11/2002 | Cepas et al. | |
| 6,523,235 B1 * | 2/2003 | Ishigaki et al. | 29/25.42 |
| 6,829,133 B2 | 12/2004 | Wermer et al. | |
| 6,912,115 B2 | 6/2005 | Kobayashi et al. | |

* cited by examiner

*Primary Examiner*—Long K Tran
(74) *Attorney, Agent, or Firm*—Pritzkau Patent Group, LLC

(57) ABSTRACT

An exemplary embodiment providing one or more improvements includes a capacitor with a segmented end electrode and methods for segmenting an end electrode of a capacitor for reducing or eliminating instances of thermally induced damage of the capacitor.

19 Claims, 2 Drawing Sheets

SEGMENTED END ELECTRODE CAPACITOR AND METHOD OF SEGMENTING AN END ELECTRODE OF A CAPACITOR

RELATED APPLICATIONS

This is a divisional application of prior U.S. patent application Ser. No. 11/495,447, filed on Jul. 28, 2006, now U.S. Pat. No. 7,453,114; which claims priority from U.S. Provisional Application Ser. No. 60/595,783, filed on Aug. 5, 2005; the disclosures of which are incorporated herein by reference.

BACKGROUND

Many modern capacitors are made using a capacitor body with metallized film. The metallized film typically includes a thin polymer film such as polypropylene on which a thin metal film has been condensed or otherwise deposited. The metallized film is arranged in a manner in which the thin metal films form two separate internal electrodes that are separated by the polymer film. The two separate internal electrodes are substantially electrically isolated from one another and a capacitance is exhibited between the internal electrodes. The thin metal film of each internal electrode is connected to an end electrode and terminations are connected to each end electrode to electrically connect to the capacitor.

In some instances, two separate sheets of metallized film are rolled or wound together into a cylindrical shaped capacitor body having two generally circular ends. The sheets of metallized film are offset from one another so that each separate sheet only extends all the way to one of the generally circular ends. In these instances, each end electrode is positioned at one of the generally circular ends and is connected to the sheet of metallized film that extends to the end where the end electrode is positioned. This construction yields an annular form capacitor that has a cross-section with layers of metallized film that alternate between the two separate internal electrodes formed by the thin metal film of each sheet. In this instance, each of the end electrodes connects together the layers of the respective internal electrodes.

In other instances, each of the internal electrodes is formed of separate layers of the metallized film to create a rectangular shaped capacitor body. In these instances the layers of one internal electrode are arranged to alternate with the layers of the other internal electrode and are offset from one another on two ends. The end electrodes in these instances, provide an electrical connection between the individual layers of each internal electrode at the offset ends. Other types of capacitors have layers of metal and dielectric such as polymers, in various arrangements, which are not affixed to one another prior to the assembly of the capacitor.

One common technique that is used to create the end electrodes is called end spray. In this technique a molten end spray metal, which may include tin, zinc or other conductive materials, is sprayed onto each of the offset ends of the layers of metallized film. The spray continues until the end spray metal builds up to a certain thickness. The end spray metal sticks to the metallized film and, when the molten metal cools and solidifies, the end spray metal is electrically connected to the metal of the metallized film. The solidified end spray metal on each end connects to one of the internal electrodes where they serve as the end electrodes. Typically, the end spray metal is sprayed onto the ends of the metallized film in as uniform a manner as possible. Other techniques for creating metal end electrodes may also be available.

One of the problems encountered in the use of metal or other types of rigid end electrodes relates to the failure of the capacitor due to one or both of the end electrodes cracking. Many cracking problems are thermally induced as a result of the capacitor being subjected to temperature changes and repeated temperature cycling. In some instances, thermally induced cracking includes the condition where one or both end electrodes at least partially separate from the internal electrodes of the capacitor body. Such a separation changes the characteristics of the capacitor, such as the capacitance and/or current carrying or other characteristics of the capacitor. Other types of thermally induced cracking or damage involve the end electrodes themselves cracking into pieces.

Operation of the capacitor in environments where wide ranges of temperatures are encountered exacerbates the problems with thermally induced cracking. Some environments, which include some types of tests, subject the capacitor to temperatures ranging from −50° C. to 100° C. When the capacitor is heated, through external and/or internal influences, the layers and end electrodes of the capacitor expand; and when the capacitor is cooled, the layers and end electrodes contract.

In many instances, the cracks are a direct result of the dielectric having a different Coefficient of Thermal Expansion (CTE) than the CTE of the end electrode. In some instances, the CTE of the dielectric is an order of magnitude greater than the CTE of the end electrode. When the CTE of the dielectric is greater than the CTE of the end electrode, the dielectric expands at a greater rate than does the end electrode. This can cause the internal electrodes surrounded by the dielectric to be pulled away from the end electrodes.

Typically capacitors are subject to heat generated externally to the capacitor and internal to the capacitor. External heating comes from the devices and atmosphere surrounding the capacitor which typically causes a more or less uniform heating of the capacitor. On the other hand, internal self heating is caused by electrical losses inside the capacitor. Internal self heating can cause the metallized film or other internal electrode and dielectric to be subjected to a higher temperature than the end electrodes. This situation leads to more rapid failure of the capacitor since the increased temperature experienced by the metallized film causes the metallized film to expand more than the end electrodes, thereby typically causing the end electrodes to break or causing other damage to the capacitor.

In some circumstances, some portions of the inside of the capacitor become hotter than other portions of the inside of the capacitor. In these situations, the metallized film expands more in the hotter portions than in the cooler portions which causes a non-uniform stress on the end electrodes which can lead to capacitor failure.

The rigid end electrodes of some capacitors can be very large, sometimes exceeding ten or more inches in diameter for a cylindrically shaped capacitor, for instance. These large capacitors have many layers of dielectric material which, when heated, expand together to increase the overall dimensions in one or more directions of the capacitor. The overall expansion of each dimension of the dielectric is greater than the overall expansion of each corresponding dimension of the rigid end electrodes. Therefore, since the dielectric and rigid end electrodes are connected to one another but the dielectric is expanding faster than the end electrodes, the end electrodes crack. Thermally induced cracking happens to small capacitors as well as large capacitors, although thermally induced cracking may be more pronounced in large capacitors.

The foregoing examples of the related art and limitations related therewith are intended to be illustrative and not exclusive. Other limitations of the related art will become apparent to those of skill in the art upon reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

A method for manufacturing a capacitor is described in the present disclosure. The method allows the capacitor to resist thermally induced damage. In the method, a capacitor is formed by positioning a first electrically conductive layer in a spaced apart relationship with a second electrically conductive layer using a dielectric material in between the first and second layers. The first layer has a first layer lengthwise edge at a first end of the capacitor body and the second layer has a second layer lengthwise edge at a second, opposing end of the capacitor body. An end spray metal is sprayed into contact with the first layer lengthwise edge at the first end of the capacitor body to create a first end electrode and the end spray metal is sprayed into contact with the second layer lengthwise edge at the second end of the capacitor body to create a second end electrode. The end spray metal has a coefficient of thermal expansion that is different than a coefficient of thermal expansion of the dielectric material. The first end electrode is divided into first electrode segments which are each electrically connected to different portions of the first layer lengthwise edge at the first end. The first electrode segments are arranged to allow the dielectric material to thermally expand and contract while the segments remain electrically connected to the different portions of the lengthwise edge at the first end. The first electrode segments are connected together with flexible electrical conductors to electrically connect the first electrode segments together while allowing the first electrode segments to move substantially independently from one another. The capacitor exhibits a capacitance between the connected first electrode segments and the second end electrode.

Another method disclosed involves a method for reducing thermally induced damage in a metallized film capacitor. The capacitor has an arrangement of first and second internal electrodes made with layers of metallized film that are electrically isolated from one another. The first internal electrode is electrically connected to a first end electrode at a first end and the second internal electrode is electrically connected to a second end electrode at a second end. The first and second end electrodes are substantially rigid and have a coefficient of thermal expansion that is different from a coefficient of thermal expansion of the metallized film. The end electrodes are divided into electrode segments to allow the metallized film to thermally expand and contract while the first internal electrode remains electrically connected to the first end electrode and the second internal electrode remains electrically connected to the second end electrode.

Another method involves producing a capacitor with metal end electrodes connected to a wound metallized film. The metallized film has a dielectric that thermally expands and contracts. The end electrodes are divided into a plurality of electrode segments which can move substantially independently from one another while remaining connected to the metallized film responsive to thermal expansion and contraction.

A capacitor is disclosed which has a first electrically conductive layer having a first layer lengthwise edge and a second electrically conductive layer having a second layer lengthwise edge, where the first and second electrically conductive layers are arranged in a spaced apart relationship from one another. A dielectric material is positioned between the first and second electrically conductive layers. A first end electrode is electrically connected to the first layer lengthwise edge, and a second end electrode is electrically connected to the second layer lengthwise edge. The second end electrode is divided into a plurality of electrode segments that are each connected to different portions of the second layer lengthwise edge. The dielectric material is capable of thermally expanding and contracting while the electrode segments remain connected to the second layer lengthwise edge. The capacitor exhibits a capacitance between each of the electrode segments and the first end electrode.

In addition to the exemplary aspects and embodiments described above, further aspects and embodiments will become apparent by reference to the drawings and by study of the following descriptions.

DETAILED DESCRIPTION

Figure 1:
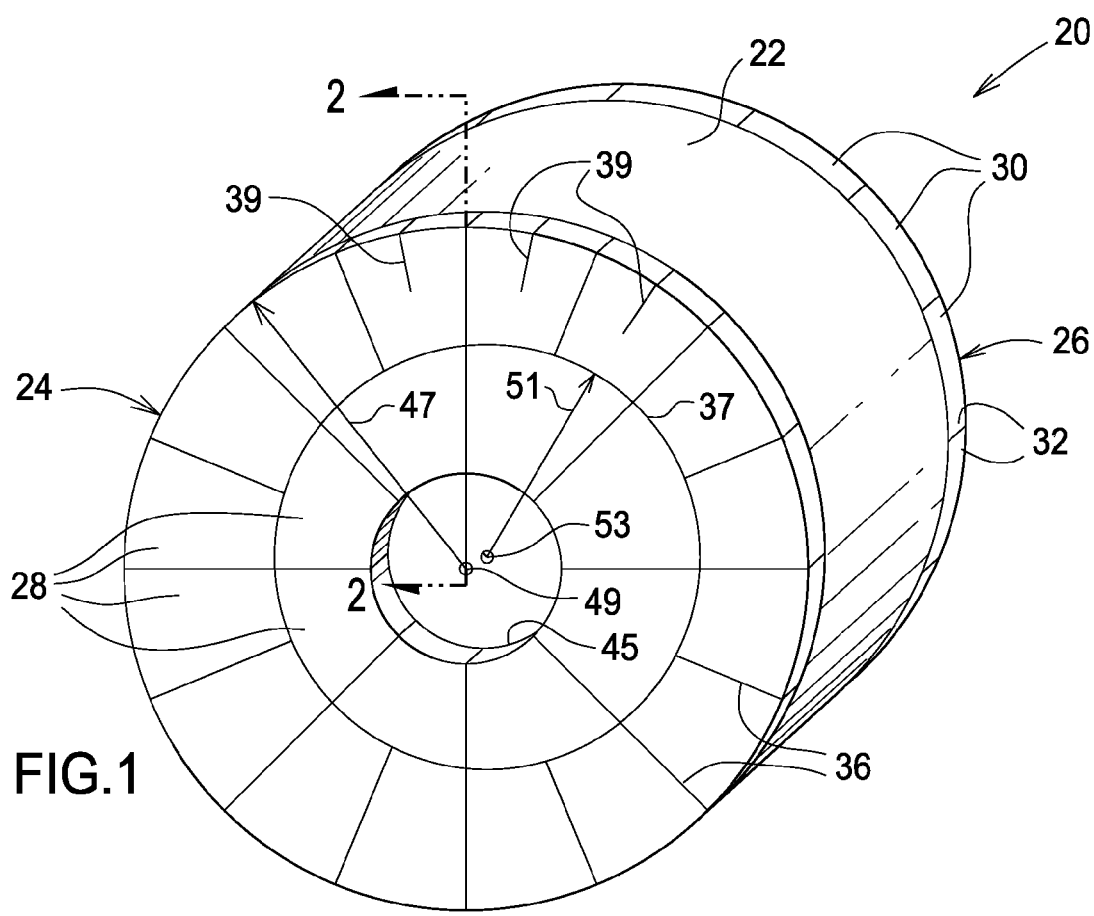
FIG. 1 is a perspective view of a capacitor having segmented end electrodes according to the present disclosure.

A capacitor 20 according to the present disclosure is shown in FIG. 1. Exemplary capacitor 20 includes a capacitor body 22 and two end electrodes 24 and 26 which are divided into end segments 28 and 30, respectively. Dividing or segmenting end electrodes 24 and 26 allows the segments to move substantially independently from one another which avoids or reduces instances of thermally induced cracking of the end electrodes.

Each of segments 28 and 30 are connected with a different portion of capacitor body 22 and are not directly connected to one another with a rigid interface. This allows individual segments 28 and 30 to move with expansion and contraction of the portion of capacitor body 22 to which they are connected without causing cracks to form in end electrodes 24 and 26.

Since each segment is connected to a different portion of the capacitor body, each segment is therefore substantially only subject to forces caused by the connected portion of the capacitor body. The forces are caused by a relative change in dimension between the segment and the portion of the capacitor body to which it is attached, due to the segment and capacitor body having different coefficient of thermal expansions (CTE). By dividing the end electrodes into segments, these forces are overcome by the strength of the attachment between the capacitor body and the segments.

Figure 2:
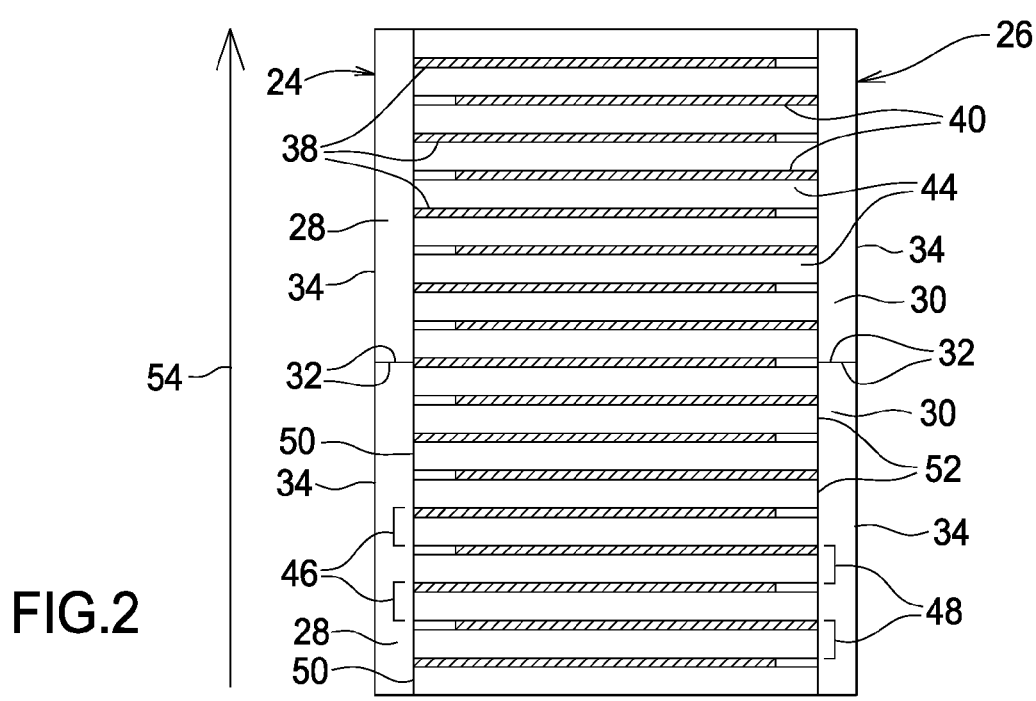
FIG. 2 is a section view of the capacitor shown in FIG. 1, taken along section line 2-2.
Figure 3:
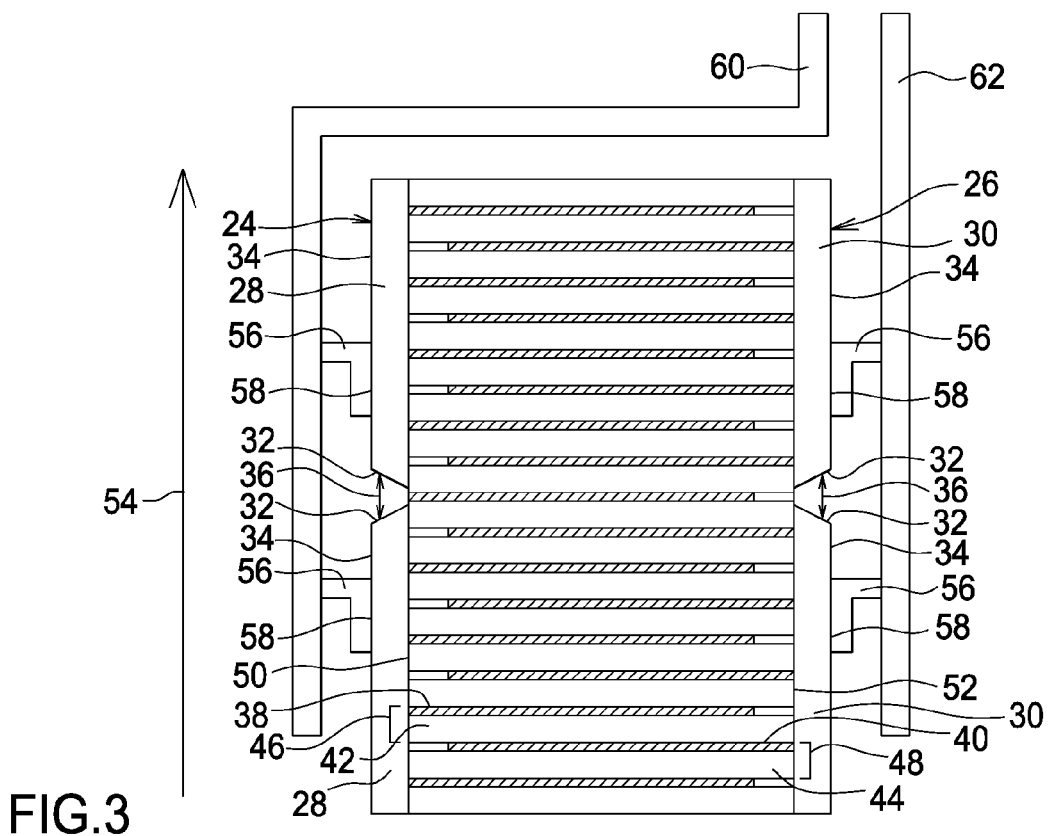
FIG. 3 is another section view of a capacitor according to the present disclosure having segmented end electrodes which are electrically connected to one another.

Segments include segment edges 32 and segment faces 34, FIGS. 2 and 3. In some instances, the segment edges 32 of adjacent segments may at least temporarily contact one another, FIGS. 1 and 2. This is not considered to affect the substantially independent nature of the movement of the segments relative to one another. Gaps 36 define segment edges 32 between adjacent segments. In other instances, segment edges 32 of adjacent segments 28 or 30 do not contact one another at any temperature, FIG. 3. In these instances, gap 36 is relatively large. Other partially extending gaps 39, FIG. 1, may not be between separate electrode segments, but may instead extend only partially across an electrode segment. Partially extending gap 39 may allow the electrode segment to deform rather than crack when subjected to stress. Other configurations of gaps and segments may also be used for reducing the incidence of thermally induced damage.

As the temperature of the capacitor increases, the segments will move further away from one another. The segments move further away from one another in these instances because material in capacitor body 22 has a higher CTE than does the material of the end electrodes 24 and 26. This situation causes an increase in the size of gaps 36 between adjacent segments and limits or eliminates the effect that the movement of one segment has on the movement of other segments. Therefore, as capacitor body 22 increases in temperature the body expands at a greater rate than do segments 28 and 30, which causes the segments to be moved away from one another in a plane of end electrodes 24 and 26.

Capacitor body 22 includes internal electrodes or electrically conductive layers 38 and 40 and dielectric material or layers 42 and 44, as shown in FIGS. 2 and 3. Electrically conductive layers 38 and 40 are arranged for producing a capacitance. Capacitor body 22 shown in FIG. 1 has a cylindrical or annular shape with two circular ends where end electrodes 24 and 26 are attached to electrically conductive layers 38 and 40, respectively. Capacitor body 22, in the present example, defines a cylindrical opening 45.

In some instances, the cylindrically or annular shaped capacitor body has generally circular end electrodes 24 and 26 which are defined by a radius 47 that extends from a center point 49. A circularly shaped gap 37 can be used with capacitor body 22 where the circular gap is defined by a radius 51 which extends from a center point 53. In this instance, center point 53 can be located at a different position than center point 49 so that circular gap 37 is not concentric with generally circular end electrode 24. The non-concentric nature of circular gap 37 prevents the gap from being generally co-linear with electrically conductive layers 38 or 40 for any substantial length which limits the distance that electrical current must flow along a length of electrically conductive layer 38 or 40 before reaching end electrode 24 or 26.

In the case of cylindrically shaped capacitor body 22 of the present examples, the body is formed by rolling together two sheets 46 and 48 of metallized film. Metallized film 46 and 48 has a film portion which serves as dielectric 42 and 44, respectively, and a metal layer having deposited thereon a thin coating on the film portion and which serves as the electrically conductive layers 38 and 40, respectively. Typically, the film portion is a type of polymer and the metal is deposited on the polymer by condensing a metal vapor. Multiple layers of electrically conductive layers 38 and 40 and dielectric 42 and 44 are displayed in a cross section of cylindrically shaped body 22, as shown in FIGS. 2 and 3, however, every other layer 38 or 40 simply represents additional turns of the sheets 46 and 48, respectively. Capacitor body 22, shown in FIGS. 2 and 3, increases in radius in the direction of arrow 54.

The two sheets 46 and 48 are rolled together to form capacitor body 22, in the present example, in such a way that electrically conductive layer 38 extends to a lengthwise edge 50 of sheet 46 and electrically conductive layer 40 extends to a lengthwise edge 52 of sheet 48 as shown in FIGS. 2 and 3. Electrically conductive layers 38 are connected to end segments 28 of end electrode 24 along lengthwise edge 50.

Other methods of constructing capacitor body 22 into the cylindrical or other shapes may also be used. For example, separate layers of electrically conductive material and dielectric may be used, and the capacitor body may be formed with a rectangular shape.

End electrodes 24 and 26 are typically attached to capacitor body 22 by spraying an end spray metal onto the lengthwise edges 50 and 52, respectively. In this spraying process, the end spray metal is heated to a molten state and droplets of the metal are deposited onto edges 50 and 52 where contact is made with electrically conductive layers 38 and 40, respectively. Metals used for the end spray metal include tin, zinc, and/or others. The droplets of end spray metal are deposited on capacitor body 22 until the end electrodes are sufficiently thick. In some examples, sufficient thickness occurs when the end electrodes are thick enough to withstand connection of flexible electrical conductors 56 (FIG. 3) at connection points 58 on the faces 34 of the end electrodes 24 and 26. As an example, the thickness of the sprayed electrodes in some capacitors is typically 0.005" to 0.025" thick.

In some instances, end electrodes 24 and 26 are segmented or divided by using a mask with the spraying process. In these instances, the mask is placed relative to lengthwise edges 50 and 52 of capacitor body 22 during the spraying process. The mask may have metal rods or spokes which block the droplets end spray metal from reaching portions of lengthwise edges 50 and 52 of electrically conductive layers 38 and 40 which leaves gaps 36 in end electrodes 24 and 26. Segments 28 and 30 are formed with the end spray metal where the mask does not block the droplets from contacting lengthwise edges 50 and 52. Other materials and masking techniques may be used to create end electrodes 24 and 26 with segments 28 and 30.

Segments 28 and 30 may also be created by sawing or otherwise cutting the end electrodes 24 and 26 after the end electrodes are connected or formed on capacitor body 22 as solid or undivided pieces. In one instance, a circular saw blade is used to cut gaps 36 in end electrodes 24 and 26 to create the segments 28 and 30. Some segments 28 and 30 are divided with an arrangement where at least some gaps 36 run along a radius of a circularly shaped end electrode. Other segment patterns or arrangements may also be used so long as the segments reduce the instance of cracking of the end electrodes. Some patterns or arrangements of segments may be better at reducing or eliminating thermally induced damage than other patterns or arrangements of segments. This may depend, at least in part, on the directions in which capacitor body 22 expands the greatest when heated. It is considered that one of ordinary skill in the art can accomplish forming segments in a suitable manner such as, for example, by using a mask, sawing or in any other suitable way, with this disclosure in hand.

The number of segments is based at least partially on the size of end electrodes 24 and 26, in some instances. Larger end electrodes generally require more segments than do small end electrodes. Typically, more segments yield a decreased risk of thermally induced damage than does fewer segments for a given size of end electrode. However, there are practical limits on the number of segments which the end electrodes can be divided into, since it is typically more difficult to attach flexible conductors 56 to smaller segments. As an example, a cylindrical or annular shaped capacitor having an end electrode with a diameter of approximately ten inches, may have 12 to 24 separate electrode segments on each end. These or other end electrodes may have more or less segments, and the number or arrangement of segments on each end electrode of a single capacitor may be different.

Segments 28 and 30 shown in FIG. 3 are attached to buses 60 and 62 with flexible electrical conductors 56. Buses 60 and 62 are relatively rigid and flexible electrical conductors 56, shown in FIG. 3, are made of bendable metal which allows the segments to move relative to one another without breaking loose from busses 60 and 62. Flexible electrical conductors 56 electrically connect segments 28 to buses 60 and electrically connect segments 30 to bus 62. Buses 60 and 62 serve as terminals to connect capacitor 20 to other electrical components (not shown).

Figure 4:
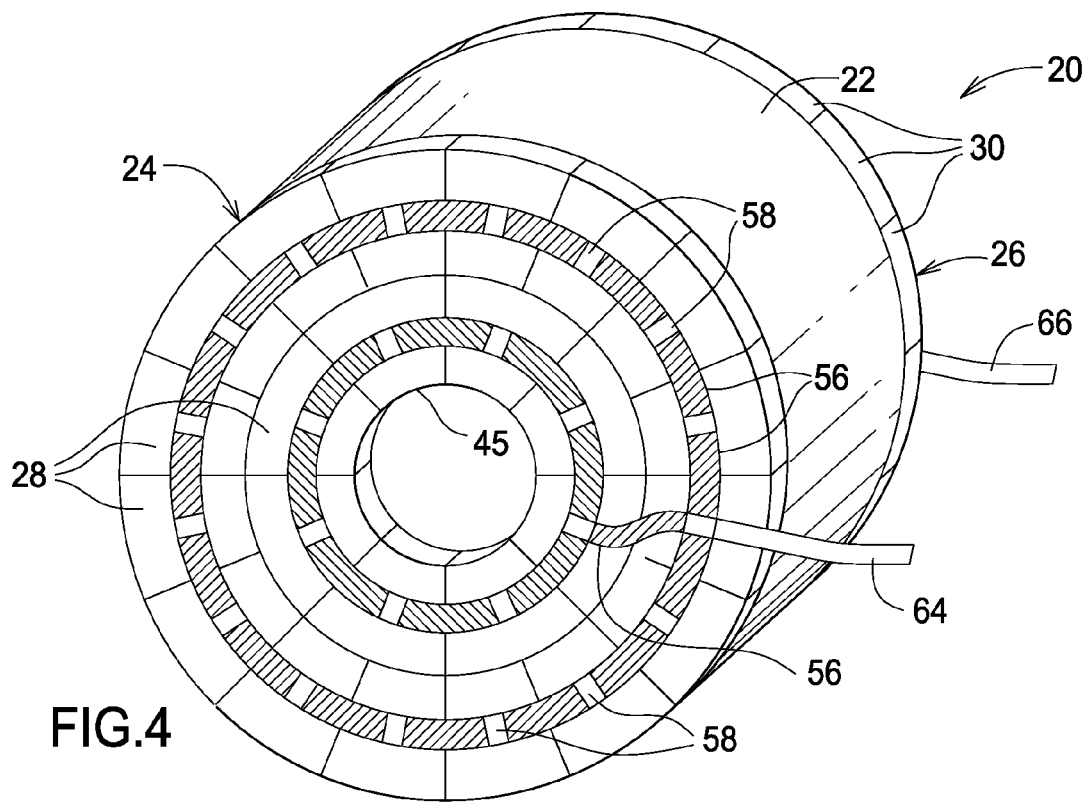
FIG. 4 is a perspective view of a capacitor according to the present disclosure having segmented end electrodes which are electrically connected to one another.

Flexible electrical conductors 56 shown in FIG. 4 are made of braided wires. Flexible electrical conductors 56, in this instance, electrically connect adjacent segments 28 to one another and adjacent segments 30 to one another at connection points 58. In this arrangement, all of segments 28 are electrically connected to one another to serve as end electrode 24; and all of the segments 30 are electrically connected to one another to serve as end electrode 26. Flexible cables 64 and 66 serve as terminals to electrically connect each end electrode 24 and 26 of the capacitor 20 to other electrical components.

In addition, or as an alternative to having all of the segments electrically connected together, each of the segments 28 and 30 can each have independent flexible terminals and/or the segments can be organized in groups which are electrically connected together. In some instances, the terminals are connected together externally to the capacitor. In some instances, the capacitor may have only one end electrode divided into segments. Generally, connections to segments 28 and 30 should have a flexible nature which does not unduly interfere with the movement of one segment relative to the other segments.

An added benefit experienced by connecting an independent flexible terminal to each of the segments is that the equivalent series inductance (ESL) of the capacitor is reduced in comparison to similar capacitors which do not have independent terminals to each segment. Reduction of ESL is important because it improves the ability of a circuit to reduce ripple on a power bus. When each segment is connected to the power bus with a separate terminal, each segment behaves as a quasi-discrete capacitor. This causes an overall ESL of the capacitor to be reduced relative to an identical capacitor having a single continuous end electrode with a single terminal on each end of the capacitor.

Segmenting one or more of the end electrodes improves the reliability of the capacitor by reducing or eliminating the incidences where the capacitor fails or degrades due to thermally induced damage. Affects of CTE mismatch are mitigated by separating the end electrodes into segments which reduces forces acting to damage the end electrodes. The segments reduce or eliminate the effects that expanding portions of one part of the capacitor body have on segments which are not connected to the part of the capacitor body. Segmenting the end electrodes allows the segments to move in different directions and/or at different rates from one another, which reduces the stress between different portions of the end electrodes. Segmented end electrodes can be used on capacitors with a metal or rigid interface between capacitor internal electrode layers and external connections.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for manufacturing a capacitor which resists thermally induced damage, the method comprising:

forming a capacitor body by positioning a first electrically conductive layer in a spaced apart relationship with a second electrically conductive layer using a dielectric material in between the first and second layers, said first layer having a first layer lengthwise edge at a first end of said capacitor body and said second layer having a second layer lengthwise edge at a second, opposing end of said capacitor body;

spraying an end spray metal into contact with the first layer lengthwise edge at the first end of the capacitor body to create a first end electrode and spraying the end spray metal into contact with the second layer lengthwise edge at the second end of the capacitor body to create a second end electrode, the end spray metal having a coefficient of thermal expansion that is different than a coefficient of thermal expansion of the dielectric material;

dividing the first end electrode into first electrode segments which are each electrically connected to different portions of the first layer lengthwise edge at the first end, the first electrode segments arranged to allow the dielectric material to thermally expand and contract while the segments remain electrically connected to the different portions of the lengthwise edge at the first end; and connecting the first electrode segments together with flexible electrical conductors to electrically connect the first electrode segments together while allowing the first electrode segments to move substantially independently from one another, where the capacitor exhibits a capacitance between the connected first electrode segments and the second end electrode.

2. A method as defined in claim 1, further comprising:

dividing the second end electrode into second electrode segments which are each electrically connected to a different portion of the second layer lengthwise edge at the second end to allow the dielectric material to thermally expand and contract while the second electrode segments remain connected to the second layer lengthwise edge; and connecting the second electrode segments together with flexible electrical conductors to electrically connect the second electrode segments together while allowing the second electrode segments to move substantially independently from one another, where the capacitor exhibits said capacitance between the connected first electrode segments and the connected second electrode segments.

3. A method as defined in claim 1 wherein a metallized polymer film is used in forming the electrically conductive layers and the dielectric.

4. A method as defined in claim 1 wherein the first end electrode is divided into first electrode segments by sawing the first end electrodes.

5. A method as defined in claim 1 wherein the first end electrode is divided into first electrode segments by masking the first end of the capacitor body before spraying the end spray metal into contact with the first layer lengthwise edge.

6. A method as defined in claim 5 wherein the first end is masked with a metal mask which includes metal rods.

7. A method as defined in claim 1 wherein the end electrodes are divided using a cutter tip.

8. A method as defined in claim 1 wherein the first end electrode has a generally circular shape defined by a first radius extending from a first center point and the first electrode segments include a segment circular shape that is defined by a second radius extending from a second center point, where the first and second center points are at different locations.

9. A method for reducing thermally induced damage in a metallized film capacitor having an arrangement of first and second internal electrodes made with layers of metallized film that are electrically isolated from one another and where the first internal electrode is electrically connected to a first end electrode at a first end and the second internal electrode is electrically connected to a second end electrode at a second end, where the first and second end electrodes are substantially rigid have a coefficient of thermal expansion that is different from a coefficient of thermal expansion of the metallized film, the method comprising:

dividing the end electrodes into electrode segments to allow the metallized film to thermally expand and contract while the first internal electrode remains electrically connected to the first end electrode and the second internal electrode remains electrically connected to the second end electrode; and connecting the electrode segments of each end electrode to one another electrically with one or more flexible electrical connectors.

10. A method as defined in claim 9 wherein the end electrodes are divided into segments by sawing the end electrodes after the end electrodes are spraying onto the internal electrodes in a molten state.

11. A method as defined in claim 9 wherein the end electrodes are divided into electrode segments by masking the ends of the internal electrodes and spraying the end electrodes into contact with the internal electrodes on the ends.

12. A method as defined in claim 11 wherein the segments are masked with a metal mask which includes metal rods.

13. A method as defined in claim 9 wherein the end electrodes are divided using a cutter tip.

14. A method as defined in claim 9 further comprising electrically connecting electrode segments of one end together with one another and electrically connecting electrode segments of the other end together with one another, where the electrode segments of one end are electrically isolated from the electrode segments of the other end.

15. A method as defined in claim 9 wherein the metallized films are arranged in alternating layers by rolling the metallized films into a generally cylindrical shape.

16. In producing a capacitor with metal end electrodes connected to a wound metallized film having a dielectric that thermally expands and contracts, a method comprising:

dividing each of the end electrodes into a plurality of electrode segments which can move substantially independently from one another while remaining connected to the metallized film responsive to thermal expansion and contraction; and connecting the electrode segments of each end electrode to one another electrically with one or more flexible electrical connectors.

17. A method as defined in claim 16 wherein the electrode segments are connected to one another electrically using one or more braided cable electrical connectors.

18. A method as defined in claim 16 wherein the end electrodes are divided using a cutter tip.

19. A method as defined in claim 16 wherein the metal end electrodes have a generally circular shape defined by a first radius extending from a first center point and the segments include a segment circular shape that is defined by a second radius extending from a second center point, where the first and second center points are at different locations.

* * * * *